United States Patent [19]
Kellogg

[11] Patent Number: 4,584,625
[45] Date of Patent: Apr. 22, 1986

[54] CAPACITIVE TACTILE SENSOR

[76] Inventor: Nelson R. Kellogg, c/o Program in History of Science, 220 Palmer Hall, Princeton University, Princeton, N.J. 08540

[21] Appl. No.: 649,312

[22] Filed: Sep. 11, 1984

[51] Int. Cl.⁴ .................... H01G 7/00; B25J 3/00; A61F 1/06
[52] U.S. Cl. .................................. 361/283; 414/5; 901/33
[58] Field of Search ............... 361/283; 73/718, 721; 901/33; 414/5

[56] References Cited

U.S. PATENT DOCUMENTS

| | | | |
|---|---|---|---|
| 3,173,745 | 3/1965 | Stone | 346/107 R |
| 3,233,247 | 2/1966 | Rychlewski | 346/107 R |
| 3,449,008 | 6/1969 | Colechia | 414/5 X |
| 3,509,583 | 5/1970 | Fraioli | 901/33 X |
| 3,904,234 | 9/1975 | Hill et al. | 414/5 X |
| 3,980,888 | 9/1976 | Gudden | 428/917 |
| 4,266,263 | 5/1981 | Haberl et al. | 361/283 |
| 4,302,138 | 11/1981 | Zarudiansky | 901/33 X |
| 4,371,744 | 2/1983 | Badet | 361/414 |
| 4,458,989 | 7/1984 | Tschang | 346/160 |
| 4,521,685 | 6/1985 | Rebman | 414/5 X |

Primary Examiner—Donald A. Griffin

[57] ABSTRACT

Contact pressure between the surface of the sensor and the surface of a second object can be measured by a change in capacitance across compressible cells, which comprise the active elements of the sensor. The design allows for the accurate measurement of different pressures at different locations in the area of contact (spatial discrimination), and can be used over a wide range of pressure. As a passive device, it requires external modulation and detection.

8 Claims, 7 Drawing Figures

CAPACITIVE TACTILE SENSOR

This invention was conceived to meet a need in the field of robotics for a simple and reliable contact sensor, to be used in robot end-effectors (viz. grippers), though the device is not limited to this application. An accurate tactile sense is desirable to allow broad tasking of robots, and for tasks requiring a robot to make judgements by interaction. The sensor should not simpy provide information that an object is being grasped. The ideal device should provide an accurate measurement of pressure applied, as well as measuring pressure variations over the area of contact. Certainly the device should be durable and reliable.

The proposed sensor has the above attributes as well as a number of other advantages. The sensor requires no exotic materials or esoteric manfacturing techniques. Possible materials will be suggested, and some notes on construction will be found in the detailed description.

The sensor can be made to accomodate many different sizes, pressure ranges, and degrees of spatial discrimination, using essentially the same design. Many changes can easily be effected externally (via a control keyboard), thereby necessitating very few sensor configurations for a wide range of application. The sensor design is also easily adapted for use on a curved or non-uniform gripping surface, or for tactile sensing on articulated fingers.

The known devices for tactile pressure sensing have a number of deficiencies. Devices may be grouped according to their transducing principle.

A common method for pressure sensing uses piezoelectric transducers. Packaging of the piezo-electric element is a primary concern in the design of such devices. Mechanical amplification (given as a ratio of surface areas) must be carefully considered, and this can severely limit the number of sensing elements in a given area of the sensor. This determines the degree of spatial differentiation. In addition, piezo-electric crystals can be easily fracture.

Another suggested approach utilizes ohmic resistance. This entails embedding conducting particles in an elastic medium. The general principle has been known for some time, and has found use in microphone elements and even pressure-sensors for fluids. However, attempted application in tactile sensing has been unsuccessful. One problem arises from the very nature of the elastic media. We know that solid elastic materials (such as silicon rubber) are not truly compressible, but only deformable. When we attempt, for example, to compress a rubber pad which has been impregnated with a conducting substance, we merely change the shape of the pad, not its volume. This gives undesirable mechanical, as well as electrical, characteristics to such a sensor.

Next, we may group a number of approaches under the single heading: indirect sensing. This involves a multiplicity of sensing techniques which do not measure pressure directly at the contact surface. An example of this approach would be to monitor the current drain of a gripper's drive motor to ascertain the force applied by the gripper. Similarly, if the gripping force were provided by pneumatic or hydraulic pressure, a spring linkage, or an electric solenoid, the appropriate quantities could be monitored and regulated.

The problems with this indirect approach are manifold. A computing algorithm must be determined separately for every machine. Even with the same gripper, objects of different size, shape, and orientation change the statics of the end-effector, and the force at the gripper reflects differently back to the driving mechanism. Finally, this approach will yield measurements which can be only broadly interpreted. Slight changes in wear or friction of the drive mechanism can result in large force differences at the gripper. This is evident even between machines of identical design and similar usage. There is simply no substitute for direct sensing.

Finally, there are systems of sensing which may be ingenious, but do not embody all the characteristics for the ideal tactile sensor discussed above. Examples include very sensitive devices which only give information concerning when physical contact is established or broken, but no information of how much pressure is exerted. Also included with such less-than-ideal systems are those which only measure the roughness of a surface.

In the drawings:

FIG. 1 shows an exploded view of a complete capacitive tactile sensing pad. The number of capacitive elements depicted is in no-wise limiting. Neither is the size or spacing of these cells indicative of a maximum, minimum or ideal condition. Furthermore, the depicting of a flat sensor array is only considered representative. The uppermost surface (30) is the gripping or contacting surface, and the bottom-most surface (10) is to be placed against the backing plate of the robot's gripper.

The sensor is made of only a few distinct parts. However, certain contours and formations of a single piece are important to the optimal functioning if the device, and hence will be numbered separately. For example, the sheet which carries the upper capacitive plates (FIG. 4) is continuous. However, because the expansion wrinkles between plates are an especially important part of the sheet, they are given a separate designation (20a).

It will soon be seen that the capacitive sensor will be presented in four configurations: standard, low-pressure, stacked, and special applications. These should not be regarded as distinct devices, for they are not. Each utilizes the same operating principles, namely a mechanical housing which responds to applied pressure by changing the spacing of parallel-plate capacitors.

The four configurations represent mechanical variations which enable this device to perform optimally under different operational constraints. One configuration is not superior to another, and in fact they are all very similar. Each is simply better suited to different demands. It is hoped that by presenting them here, the interested reader may more easily utilize this device.

Three of the four configurations employ compression cells filled with gas. Since this element is particularly useful for understanding the operation and virtues of the sensor, most of the following discussion will concern this design. The "special application" configuration substitutes an elastic solid (i.e. rubber) for the gas-filled compression cell, for use in environments where the gas cell might fail. Since all the other elements in the sensor are identical, only limited discussion is necessary.

Figure 1:
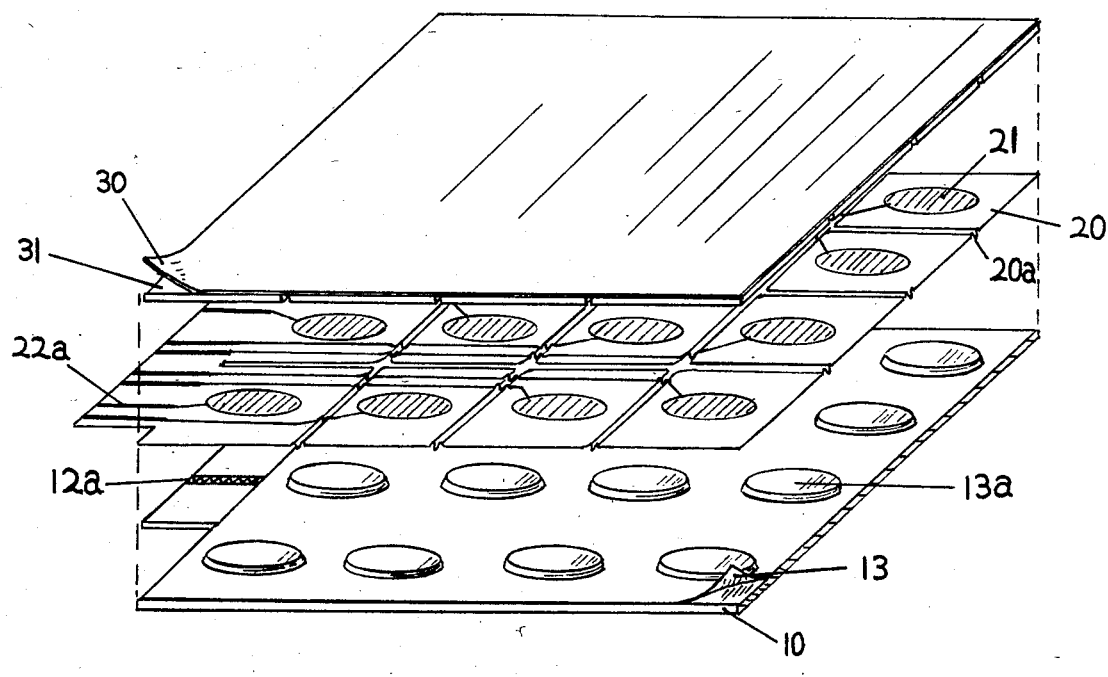
Figure 2:
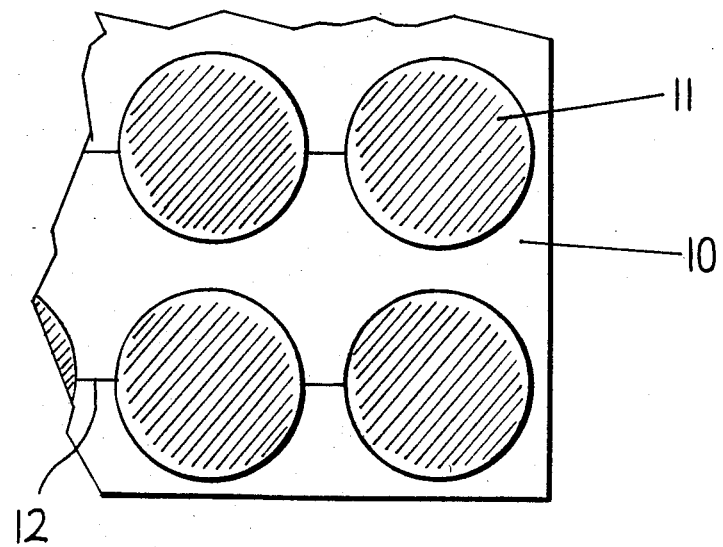
FIG. 2 shows the bottom-most layer (10) which carries the capacitor ground plates.

Referring to FIG. 1, we see that the device is conveniently viewed in layers. The bottom layer (10) serves two purposes. First, it acts as a carrier for the capacitive ground plates (FIG. 2; 11). Secondly, it serves as the bottom seal for all compression cells (13a). It is possible to specify a third function for this layer (10) as the physical base for the entire sensor. This could, though, give the false impression that the structural support is provided by this layer, when in fact it is provided by the backing-plate of the end-effector.

The second layer (13) consists of a flexible, continuous sheet with periodic, raised cavities (13a) that constitute the aforementioned compression cells. This layer (13) is firmly bonded to the bottom carrier (10) such that the only separations between these two parts are provided by the air in the compression-cell cavities.

Figure 6:
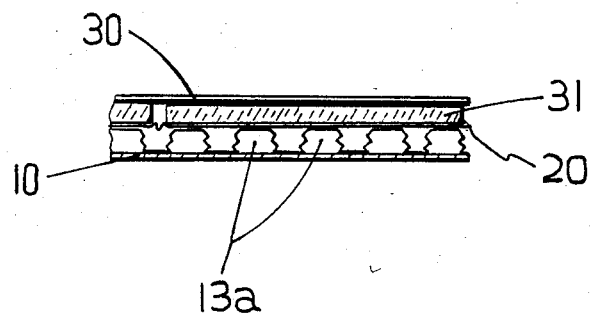
FIG. 6 is a cross-sectional view of a portion of a sensor in the low-pressure configuration.

The next layer (20) in FIG. 1 constitutes the upper capacitive plate carrier. The alignment of the plates is such that one upper capacitive plate (21) is centered over each bottom capacitive plate (FIG. 2; 11), and there is a one-to-one correspondence between upper and lower plates. In the configuration shown in FIG. 1, there is also one compression cell (13a) which separates each upper and lower plate. This last need not be the case, however, as there may be multiple, small compression cells for each capacitive element. This situation is shown in FIG. 6, and will be discussed later.

The final layer of FIG. 1 is actually a composite of two distinct parts. The first is a series of rigid segments (31) which are centered over the upper capacitive plates (21), and in a one-to-one correspondence with said plates. These segments (31) are constructed such that their combined surface area covers the entire area of the sensor, with only sufficient spacing between said segments so that they can move independently of one another over short compression distances.

Figures 5A, 5B:
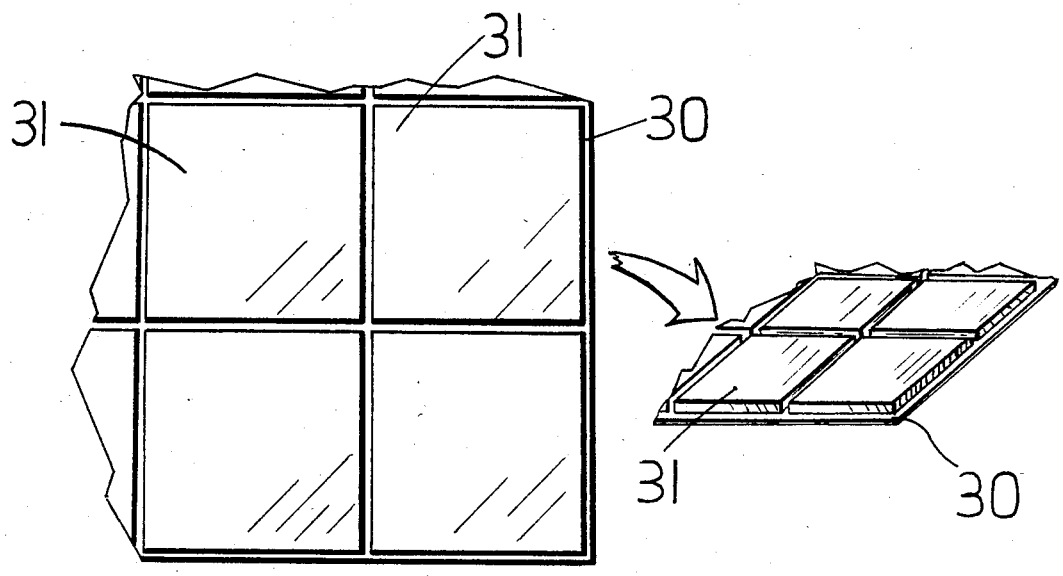
FIGS. 5a and 5b show two perspective views of a section of the upper (gripping) surface and the rigid segments it carries.

These segments, as depicted in FIGS. 5A and 5B, have a square perimeter. This is also by way of example, and not a construction constraint. They should, however, have the perimeter of regular polygons, so that they can be arranged as presenting a continuous surface, with a minimum of open space between segments.

The rigid segments (31) are bonded to their carrier (30). This sheet (30) is flexible, allowing independent movement of said segments, and also functions as the gripping surface.

The entire assembly can be held together by one of several means. The surface of the compression cells, the top plate sheet (20), and the segments (31) may all be bonded in succession, or an external frame (not shown) can be used to secure the edges of layers (10), (20), and (30). This second method is preferrable for certain applications, providing; (1) that the profile of the frame is at least as low as the complete sensor under maximum compression, and (2) that the frame not be hermetically sealed, but allow free-breathing between layers. Regarding this last point, it should be mentioned that the only elements of the sensor which should be hermetically sealed are the compression cells.

The operation of the sensor follows easily from its design. As an object is grasped in an end-effector, its surface experiences contact with the gripping surface (30), which in turn depresses the rigid segments (31) directly underneath the points of contact. Those depressed segments apply force to the top capacitor plate carrier (20) directly over the corresponding upper capacitive plates (21). The affected top plates are pushed downward, reducing their spacings from the corresponding bottom plates (11). Between any two corresponding upper and lower plates is one compression cell (13a), for the standard configuration; or multiple compression cells, in the low-pressure configuration. As a top plate experiences a force moving it toward its paired bottom plate, the intervening compression cell resists this movement with the increasing pressure of the gas inside the compression cell. Thus, the capacitance between any paired plates is a function of the force applied to the gripping surface over that capacitive element. Since the rigid segments, and the capacitive plates, have fixed surface areas, we can say that capacitance is a function of pressure.

There are a number of interesting properties exhibited by the sensor, if certain design constraints are imposed. We may decide on certain desirable characteristics first, and then see how certain constraints will enable the sensor to behave as desired.

Capacitance will be characteristically low, but it should be as high as possible without compromising the mechanical virtues of the sensor. If capacitance is too low, the control circuitry would have difficulty discriminating between a cell's capacitance, and spurious capacitive effects.

The compression distance of a cell should be as short as possible. This is both to present a uniform and secure gripping surface, as well as to minimize the "throw distance" of a gripper, once contact with an object is made.

It is necessary (for precision) that the functional relationship between pressure applied and cell capacitance be smooth, and not excessively steep or gradual in any particular pressure range. It is not necessary that this electrical response be linear, but it should at least be predictable and well-defined.

Figure 3:
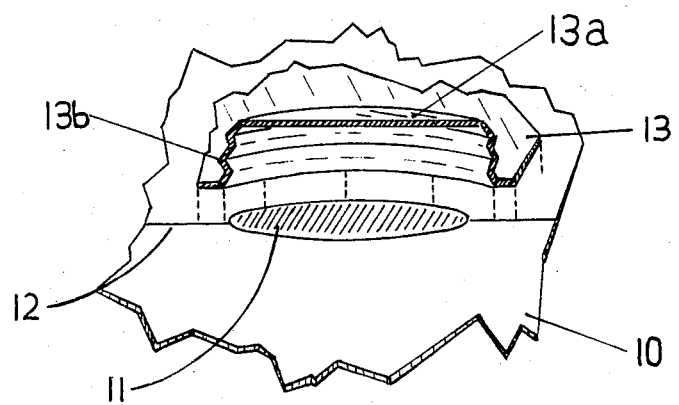
FIG. 3 shows a cut-away view of a single compression-cell, separated from a section of the bottom plate carrier.

The means of achieving all the above is found in the design of the individual compression cell. Referring to FIG. 3, we see that the compression cell is simply a contour moulded into the thin sheet (13). When this overlay is securely bonded to the bottom plate carrier (10) it leaves compressible bubbles, or compression cells.

It can be shown that to the extent the compression cell maintains the overall geometry of a right circular cylinder of constant diameter but variable height, and assuming the compressed medium behaves like an ideal gas, then the height of the compression cell is given by $$\frac{Height_{(compression)}}{Height_{(equilibrium)}} = 1 + \frac{Pressure_{(equilibrium)}}{Pressure_{(applied)}}.$$

Furthermore, if the aspect of the cell is such that the cell height is always much smaller than the diameter, then capacitance may be calculated using the well-known parallel plate approximation. We also assume that the dielectric constant of the gas is close to unity up to several atmospheres (this is true for nearly all gasses). Lastly, if the thickness of the sheet (13) forming the compression cells is small (at the top of the compression cell) compared to the overall height of the compression cell, then the dielectric effect of this material in the capacitor is small.

The net effect is a pressure-sensitive capacitor, where the functional dependence of capacitance on applied pressure tends toward linear. Below are construction techniques which will permit the device to function with these virtues.

The compression cell overlay should be made of a material which is mechanically unobtrusive (will fold or wrinkle with little mechanical resistance), but which allows for only limited stretching. If the material were to stretch easily, as for example a rubber sheet, the diameter of a compression cell would increase as pressure was applied and height reduced. This would greatly distort the response of the sensor.

A material such as bi-axially oriented polyethylene teraphthalate has these properties, and in addition is readily bondable. Although the strain is less severe, the bottom carrier should also be relatively immune from such stretching, as it forms the bottom seal of the compression cells.

To further enhance the tensile strength of the compression cell, the sidewalls of the cell (FIG. 3; 13b) should be molded in a bellows configuration. Additionally, if the sidewalls have a slight outward cant, the wrinkled cell wall will be less likely to interfere with the compression of the cell.

Keeping the cell height low reduces compression distance, but more importantly it increases both the initial capacitance and the change in capacitance during compression. It is the change in capacitance which is directly responsible for measurement precision.

It was mentioned earlier that the introduction of other dielectric materials (foam, etc.) into the compression cell region greatly reduces performance. In a closed-cell foam, for example, one does not compress the solid material significantly, but only the trapped gasses. To introduce any such material into a capacitor sensor would slightly increase the base value of capacitance, but would greatly impair compressibility. The net effect would be a drastic reduction of the fractional change of capacitance, and a consequential desensitizing of the sensor.

Next, the construction of the plate carries needs to be considered. The plates (both upper and lower) can be constructed effectively by deposition of conductive material on the carriers, in the appropriate patterns. The lower (ground) plates (FIG. 2; 11) should have a slightly larger diameter than the upper plate (21). This is to compensate for any possible lateral movement of the upper plates with respect to the lower plates, and would allow the parallel plate model to remain fundamentally intact.

Figure 4:
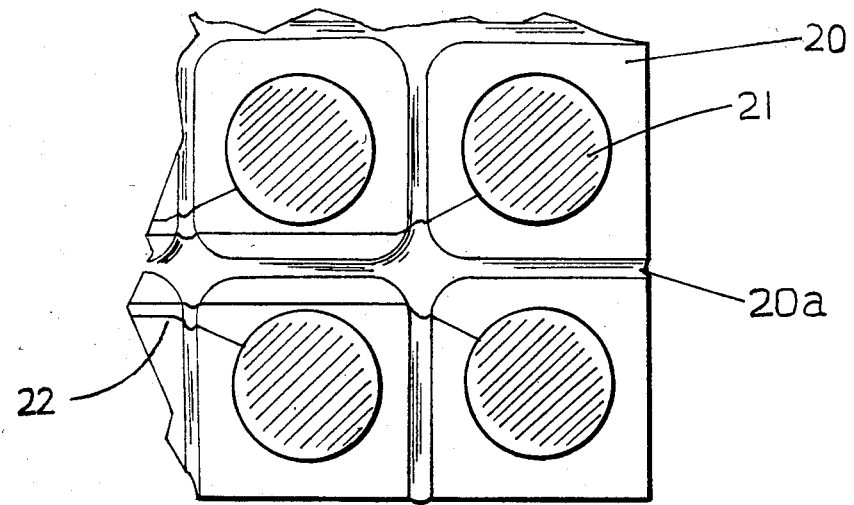
FIG. 4 is a view of a section of the upper capacitor plate carrier.

The individual ground plates are interconnected with a minimum number of narrow conducting paths (FIG. 2; 12). These leads are then collected and terminate in a single ground connection (FIG. 1; 12a). Using separate ground plates instead of one continuous ground plate has several advantages. It requires less conductive material, and provides a better bonding surface between carrier (10) and cell sheet (13). Furthermore, it allows for less spurious capacitance with upper plates and upper plate conduction paths (FIG. 4; 22).

Reference to plates (FIG. 2; 11) as ground is only in a relative sense. It will often be desirable to "float" the ground potential of the sensor with respect to machine or earth ground. What is meant by ground, then, is simply a common return.

The upper capacitive plates (FIG. 4; 21) should be imprinted on the bottom side of the carrier (20). That is, they should be on the side in contact with the compression cells. This reduces non-compressive plate spacing, and increases sensitivity. They are fully insulated from the ground plates inasmuch as the ground plates and interconnections are completely covered by the compression cell sheet (13).

The upper plate carrier (20) will be formed with expansion wrinkles (20a) between all adjacent plate regions. This allows for small displacements of the upper plates when acted on by a rigid segment (31), without causing lateral movement of the plates (21), or a stretching of the carrier (20) which could cause separations in said plates, or in the associated conducting path (FIG. 4; 22). The nature of said conducting paths, however, should allow their flexing without breaking, as nearly all such paths will need to pass over at least one group of said expansion wrinkles (FIG. 4). Said conducting paths terminate in an electrical interconnect configuration (FIG. 1; 22a) at the edge of the sensor, which, together with the common ground (FIG. 1; 12a) constitute the sensor's output connections.

The environmental, or initial condition, adaptability must now be addressed. Common variances from standard temperature and pressure (S.T.P.) can have a marked effect upon the gas contained in the compression cells. For example, consider the case where the sensor is assembled at S.T.P., and the cells are completely filled with gas at one atmosphere, such that each cell is at maximum height with no applied pressure. The sensor would work well, so long as the environment remains unchanged. Any applied pressure would effect some change in cell height, and hence some change in capacitance.

If, however, the sensor were needed to operate at 12,000 feet above sea-level each cell would have an intrinsic overpressure. In fact, other conditions being equal, this overpressure would typically be 5.4 lbs./in$^2$. This means that the applied pressure (at the cell) must exceed 5.4 lbs./in$^2$ before any change in cell height occurs. After that threshold is reached, the device would have the same performance characteristics as before. This, though, represents an unacceptable initial condition.

On the other hand, if each cell contains only enough gas to cause it to be 50% of its maximum height (with no applied pressure, at S.T.P.), this would allow the cells to freely expand or contract to accomodate the most extreme variations in terrestrial temperature and pressure. All that would be necessary, would be to initialize the system for the reference capacitance with no applied pressure, since the same functional relationship between changes in cell height and applied pressures would hold. This would insure the same essential functional dependence between changes in capacitance and changes in applied pressure.

Other Configurations

1. Low-Pressure: It should be understood that the compression cell is referenced to ambient pressure, insofar as the cell is in equilibrium with ambient atmospheric pressure in the absence of any applied (contact) pressure. Therefore, the applied pressure cannot be exceedingly small compared to ambient atmospheric pressure. One way to make the sensor more pressure-sensitive is to simply increase the surface area of the rigid segments (31) compared to the surface area of the top of the compression cells (13a). This causes a mechanical amplification of pressure. The drawback is that this limits the spatial discrimination of the sensor.

An improved approach to low-pressure sensing is simply to replace the single compression cell between each of the pairs of plates, with multiple, small compression cells (FIG. 6). Here, the sensitivity to applied pressure is increased (from the standard configuration) by a factor which is again a ratio of surface areas. It is given approximately by the ration of the top surface area of a single compression cell (from the standard configuration) to the combined to surface areas of the small compression cells between a capacitor plate pair in the low pressure configuration (other factors being equal). As previously discussed, only the compression cells should be hermetically sealed. The channels between said cells must be ported to the outside. Otherwise, the entire interior of the sensor acts as one compression region.

2. Stacked: Next, the limits of spatial discrimination need to be addressed. With the configurations already discussed, the size of the capacitor plates (and therefore the size of the rigid segments) is somewhat constrained. As the area is decreased, so is the base value of capacitance for the individual sensor elements. In order to allow smaller cell size and thus permit enhanced spatial discrimination, another configuration is introduced.

This modest variation consists simply of stacking sensors in layers, and paralleling the outputs of vertically corresponding capacitive cells. Of course, there need be only one gripping surface (30) and one layer of rigid segments (31), but the other layers would simply be stacked so that vertically adjacent (corresponding) capacitors would be exactly centered over one another. An applied force at one segment would be equally experienced by all cells in vertical alignment with that position. The electrical paralleling of the plate outputs can be accomplished at the edge connections (22a and 12a).

This paralleling is the electrical equivalent of increasing plate area. With this approach, though, the area can be increased vertically, allowing more cell regions to be placed across the sensor. This can permit greater spatial discrimination in a sensor, but the trade-off is in mechanical stability, and to some extent in single channel electrical response.

3. Special Applications: Finally, there are certain working conditions in which a gas compression cell might be failure prone. An example of such a condition would include a gripper backing plate which changes contour. This is not the same as articulated fingers, where flexion joints can be made to coincide with inter-cell spacings, or even separations between sensors. In the case where the contour is curved and possibly changing in time, the bottom plate carrier and the compression cell layer may be required to stretch. Since these layers (especially the compression cell layer) are designed to restrict stretching, the integrity of these cells could be jeopardized. To operate dependably in such conditions, or in an environment of very high ambient or applied pressures, a final configuration is suggested. It consists simply of replacing compression cells with a solid elastic material, such as silicon rubber.

The trade-off in such a configuration include a narrow range of applied pressure, and a non-linear electrical response. The effects of the shortcomings can be reduced by careful attention to the material and shape used for these elastic "spacers." A good, widely applicable design would be to form the interposing elastic into small, cylindrical nodules. These would have the approximate overall shape of the small gas compression cells in the low-pressure configuration. The reason for making the nodules small and well-spaced, is to allow them to expand in circumference under applied pressure, without causing them to interfere with neighboring nodules.

I claim:

1. A sensor for determining pressures of contact between the surface of said sensor and the surface of an object to be acted on, or from which action is to be received; wherein said sensor is comprised of regions of capacitance, whose capacitance varies according to force applied to the contact surface of said region; where capacitance of said region is established, at least in part, by the separation of conducting surfaces; wherein said seperation is maintained by compression cells, and wherein said compression cells contain only gas and provide means wherein capacitance of said regions varies linearly with external force applied to said region within the mechanical limits of said cell, and wherein said capacitance is measured by external means.

2. A sensor according to claim 1, wherein said conducting surfaces are secured to their respective carriers by any common metal-film deposition technique.

3. A sensor according to claim 2 wherein one said carrier secures conducting surfaces which are interconnected so as to be electrically equivalent, and wherein a common electrical connection is provided from these interconnected conducting surfaces at one or several edge locations on said carrier.

4. A sensor according to claim 2 wherein the second said carrier of said conducting surfaces is made of a thin, flexible, insulating sheet, and wherein said conducting surfaces are electrically unique and wherein every said unique conducting surface is connected by a conducting path to an edge of said flexible sheet; and wherein said conducting paths are affixed to said sheet in the same manner used to secure said conducting surfaces.

5. A carrier of conducting surfaces according to claim 4, wherein the carrier is provided with corrugations between all adjacent regions bearing said unique conducting surfaces, and wherein said corrugations are sufficient only to allow for the independent operational displacement of said conducting surfaces without any distension of said carrier.

6. A sensor according to claim 3 wherein said compression cells are formed by regularly-spaced hollow contours in a single, contiguous sheet; wherein said contours have the overall geometry of a frustum of a right circular cone, but whereas the sides thereof are provided with several concentric, bellows-like, pleated folds allowing for increasing or decreasing compression cell height; and wherein the material comprising said sheet offers minimal mechanical resistance to folding, but which exhibits maximal tensile strength such as is characteristic in certain bi-axially oriented polymers; wherein said compression cells are completed and sealed when said contoured sheet is bonded to the surface of said carrier of said electrically-equivalent conducting surfaces; and wherein the spacing of adjacent cells should be greater than twice the cell height.

7. A sensor according to claim 5, wherein said regions of capacitance experience external forces of compression during operation, and wherein force applied to said unique conducting surfaces is mediated through rigid, non-conducting segments; wherein one such segment is centered over each said unique conducting surface, and wherein said segments cover the entire area of said carrier of said unique conducting surfaces excepting a small spacing between adjacent segments, and wherein the dimension of said spacing is comparable to the lateral measure of said corrugations appearing on said carrier.

8. A sensor according to claim 7 wherein said rigid segments are bonded to a thin, elastic sheet, and wherein said sheet comprises the working surface of said sensor.

* * * * *